350-404 SR
XR 2,537,040 X4036C WP

Jan. 9, 1951 — I. W. DOYLE ET AL — 2,537,040

RECORDING CAMERA

Filed March 23, 1946 — 12 Sheets-Sheet 1

Irving W. Doyle
William G. Herbstreit
Erwin C. Weiblen
INVENTORS

BY Blair, Curtis & Hayward
ATTORNEYS

2537040
OR IN 346/33A

Jan. 9, 1951 I. W. DOYLE ET AL 2,537,040

RECORDING CAMERA

Filed March 23, 1946 12 Sheets-Sheet 2

Irving W. Doyle
William G. Herbstreit
Erwin C. Weiblen
INVENTORS

BY
Blair, Curtis & Hayward
ATTORNEYS

Jan. 9, 1951 I. W. DOYLE ET AL 2,537,040

RECORDING CAMERA

Filed March 23, 1946 12 Sheets-Sheet 3

Irving W. Doyle
William G. Herbstreit
Erwin C. Weiblen
INVENTORS

BY Blair, Curtis & Hayward
ATTORNEYS

Jan. 9, 1951 I. W. DOYLE ET AL 2,537,040

RECORDING CAMERA

Filed March 23, 1946 12 Sheets-Sheet 4

Fig. 4 (See Fig. 1)

Irving W. Doyle
William G. Herbstreit
Erwin C. Weiblen
INVENTORS

BY Black, Curtis & Hayward
ATTORNEYS

Jan. 9, 1951 I. W. DOYLE ET AL 2,537,040

RECORDING CAMERA

Filed March 23, 1946 12 Sheets-Sheet 5

(See Fig. 4)

(See Fig. 5)

(See Fig. 5)

Irving W. Doyle
William G. Herbstreit
Erwin C. Weiblen
INVENTOR

BY Blair, Curtis + Hayward
ATTORNEY

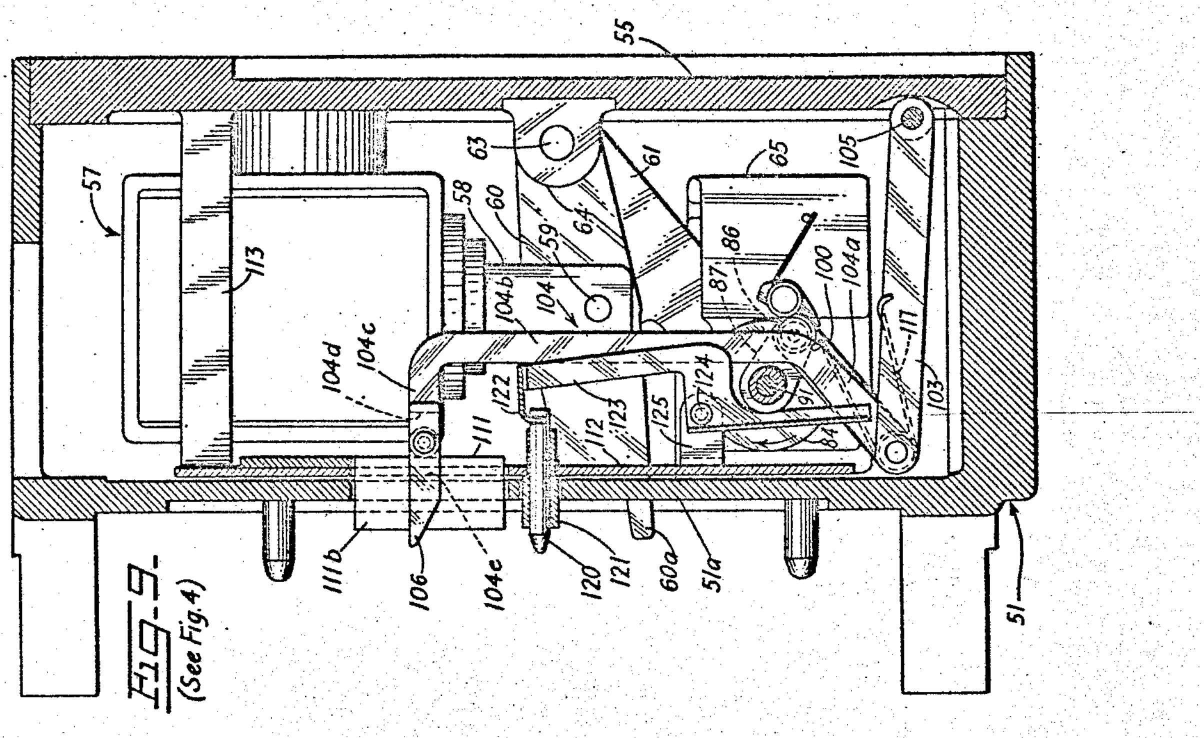
Fig-9 (See Fig.4)
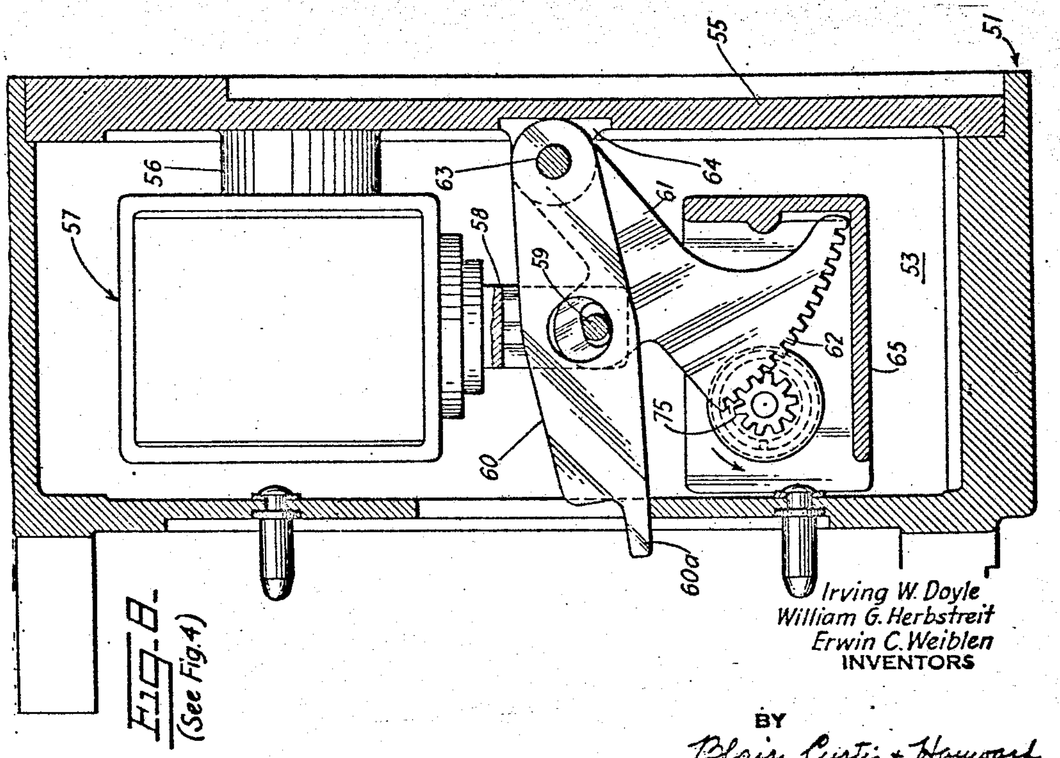
Fig-8 (See Fig.4)
Irving W. Doyle
William G. Herbstreit
Erwin C. Weiblen
INVENTORS
BY
Blair, Curtis & Hayward
ATTORNEYS Jan. 9, 1951 I. W. DOYLE ET AL 2,537,040

RECORDING CAMERA

Filed March 23, 1946 12 Sheets-Sheet 7

(See Fig. 4)

(See Fig. 4)

Irving W. Doyle
William G. Herbstreit
Erwin C. Weiblen
INVENTORS

BY
Blair, Curtis & Hayward
ATTORNEYS

Jan. 9, 1951 I. W. DOYLE ET AL 2,537,040
RECORDING CAMERA
Filed March 23, 1946 12 Sheets-Sheet 8
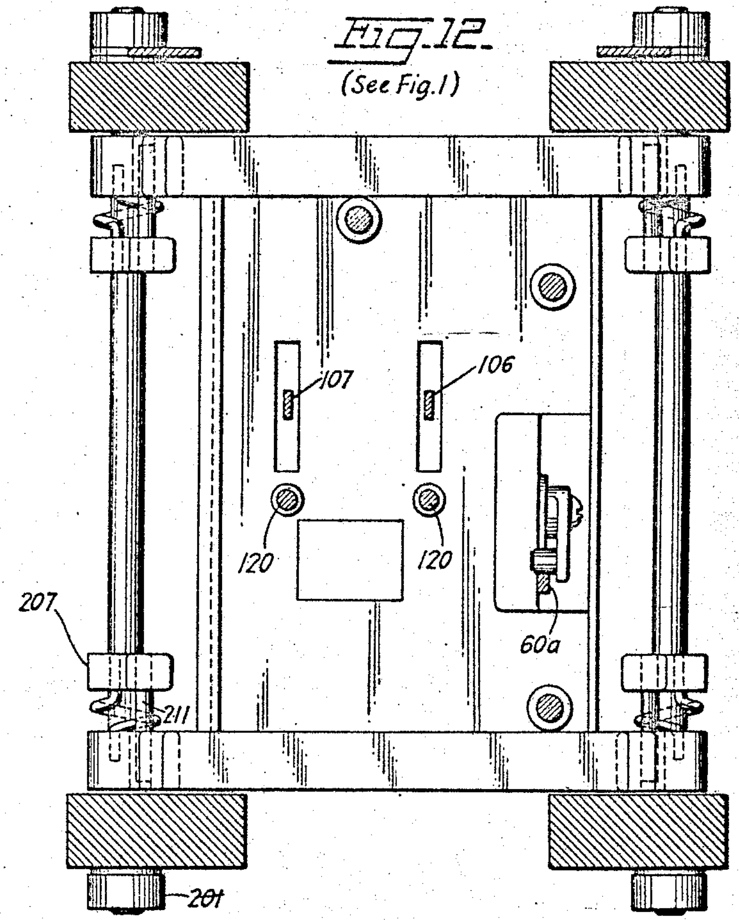
Fig. 12 (See Fig. 1)
Irving W. Doyle
William G. Herbstreit
Erwin C. Weiblen
INVENTORS
BY
Blair, Curtis & Hayward
ATTORNEYS Jan. 9, 1951 I. W. DOYLE ET AL 2,537,040
RECORDING CAMERA
Filed March 23, 1946 12 Sheets-Sheet 9
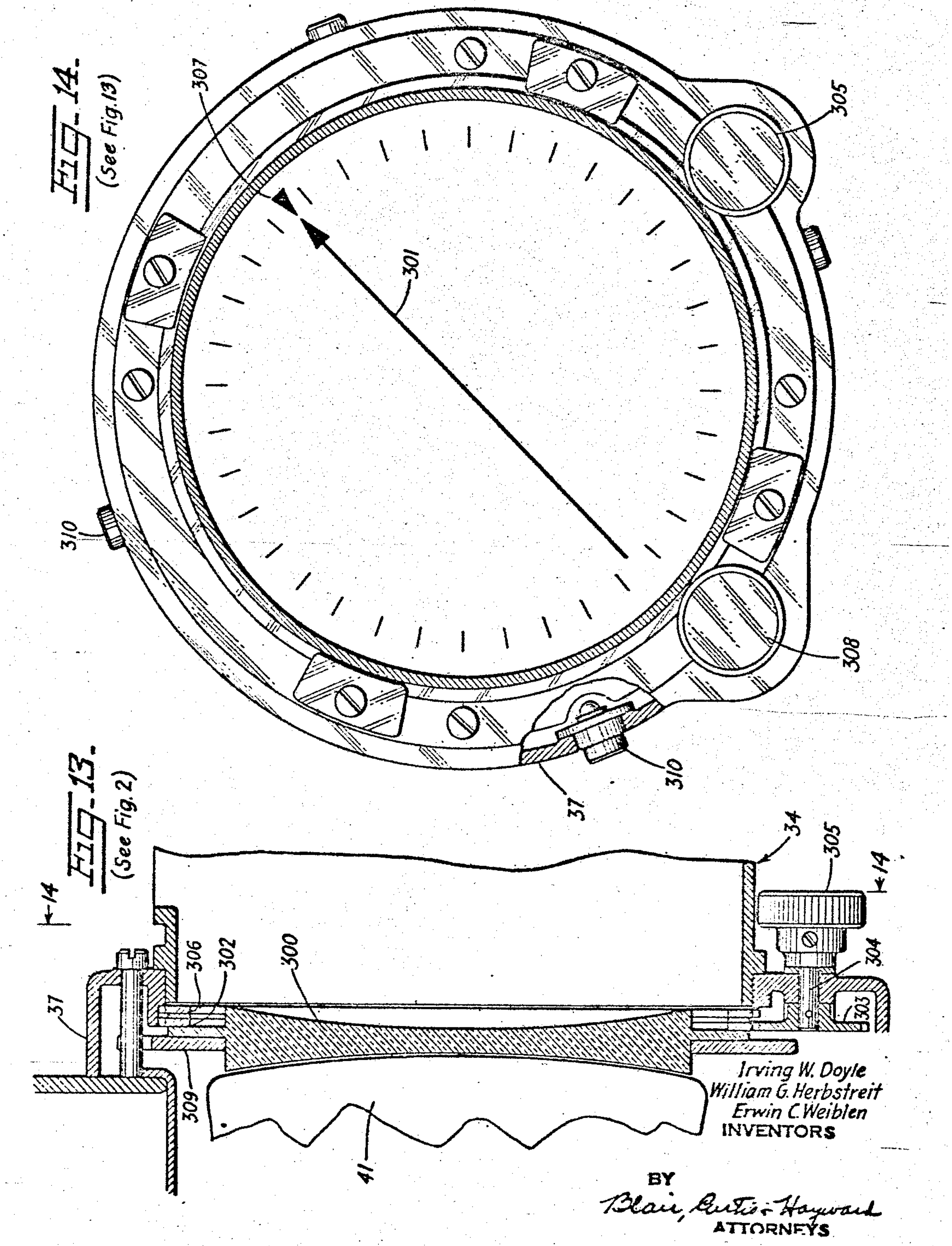
FIG. 14. (See Fig. 13) FIG. 13. (See Fig. 2)
Irving W. Doyle
William G. Herbstreit
Erwin C. Weiblen
INVENTORS
BY
Blair, Curtis & Hayward
ATTORNEYS

RECORDING CAMERA

Filed March 23, 1946 12 Sheets-Sheet 10

Irving W. Doyle
William G. Herbstreit
Erwin C. Weiblen
INVENTORS

BY Blair, Curtis & Hayward
ATTORNEYS

Irving W. Doyle
William G. Herbstreit
Erwin C. Weiblen
INVENTORS
BY Blair, Curtis & Hayward
ATTORNEYS Jan. 9, 1951 I. W. DOYLE ET AL 2,537,040

RECORDING CAMERA

Filed March 23, 1946 12 Sheets-Sheet 12

Irving W. Doyle
William G. Herbstreit
Erwin C. Weiblen
INVENTORS

BY

Blair, Curtis + Hayward
ATTORNEYS

Patented Jan. 9, 1951 2,537,040

UNITED STATES PATENT OFFICE 2,537,040

RECORDING CAMERA

Irving W. Doyle, Massapequa, William G. Herbstreit, Forest Hills, and Erwin C. Weiblen, Jamaica, N. Y., assignors to Fairchild Camera and Instrument Corporation, Jamaica, N. Y., a corporation of Delaware Application March 23, 1946, Serial No. 656,612

11 Claims. (Cl. 346—33)

This invention relates to a camera, and more particularly to a recording camera for making successive photographs of the image on a radar scope, or of a group of instruments on an airplane or ship, or for making a continuous photographic record of the performance of some object or instrument or the like in an industrial plant.

For purposes of illustration, the camera will hereinafter be described as attached to a radar set in such a manner as to take successive photographs at any one of a number of predetermined intervals of the image on the radar scope. Such a record is desirable for a number of reasons. For example, it is militarily desirable to record completely the flight of the airplane to and from its target. Thus, as imaged on the radar scope, the photographed record would comprise the start of the mission, the approach to the target, the bomb run, the position at the instant of bomb release and, if desired, the return from the target. Or, as a preliminary to a bombing mission, it might be desirable to obtain a record, i. e. a radar map, of the territory to and from any new proposed bombing target, thus to facilitate the bombing mission. By the same token, tactical radar maps for the use of infantry or artillery can be made at night, thus avoiding many of the dangers accompanying day or night aerial photographic missions.

Then too, there are many peace-time uses for radar maps. For example, radar maps of regular airline routes can readily be made, such maps being useful not only for navigation along such airline routes, but also for training radar operators.

As hereinabove indicated, there are a number of other uses for such a recording camera. Thus, the camera and magazine proper may be used in conjunction with various adaptations and with minor modifications might well be useful in connection with numerous projects other than radar photography. For instance, such a camera might readily be installed in an airplane in such a manner as to make successive photographs of a group of the airplane instruments, thus making a permanent and irrefutable record of the plane's performance over any desired period of time. Then again, the camera might be so installed on a ship or an industrial plant, or in other places, to provide a continuous record of the performance of some object, instrument or the like.

It is accordingly among the objects of this invention to provide a recording camera of the nature indicated, which is relatively simple in construction, efficient and dependable in operation, and substantially automatic in operation. Another object is to provide such a camera which is highly versatile in respect of the uses to which it might be put, and which is readily adaptable to any particular desired use. Another object is to provide a recording camera which is of such sturdy construction as to be well able to operate efficiently over extended periods of time, under adverse conditions of operation. Other objects will be in part apparent, and in part pointed out hereinafter.

In accordance with one form of our invention, the camera, which is illustratively applied in such a manner as to photograph the image on a radar scope, comprises a camera body having detachably secured thereto a strip film magazine, the camera body being adjustably fastened to an adapter which is, in turn, rotatably mounted on a fixture adapted to be attached to the radar set. The fixture is such as to include a beam splitter by which part of the light from the radar scope is reflected from the face of the beam splitter, through the adapter and camera body, to the film in the magazine, while part of the light passes through the beam splitter to be viewed by the operator. Preferably the camera body includes a compartment wherein are housed various data indicating devices which may be photographed on the film by an auxiliary lens and mirror system at the time the image on the scope is photographed.

In the drawing, wherein we have shown a specific form of our invention,

Figure 8 is a sectional elevation taken along the line 8—8 of Figure 4;

Figure 9 is a sectional elevation taken along the line 9—9 of Figure 4;

Figure 12 is an enlarged sectional elevation taken along the line 12—12 of Figure 1;

Figure 13 is an enlarged staggered section taken along the line 13—13 of Figure 2;

Figure 14 is an enlarged sectional elevation taken along the line 14—14 of Figure 13;

Similar reference characters refer to similar parts throughout the various views of the drawing.

In most aircraft installations, the complete system will include the camera and magazine, a control box for channeling impulses from the radar to the camera as desired, an adapter, as above described, for mounting the camera to the radar, and connections between the radar and the camera for the operation of the latter. In general, the camera operates as follows: When the radar is continuously scanning, the camera will be supplied with impulses of the order of two to three-tenths second duration. When it is desired to take a photograph of every scan, the camera will be actuated by each of such impulses. The camera is actuated, as will be described hereinafter, by a solenoid which, at the beginning of an impulse, winds a spring, the camera shutter being normally open. At the end of the impulse, the solenoid is deenergized and the spring drives the camera mechanism to close the shutter, transport the film, and then open the shutter again, these several portions of the operative cycle occurring with substantial rapidity. When it is desired to conserve film, the camera may be operated to take one picture of every ten scans, or one of every sixty, or other combinations. This is accomplished by a selective switch on the control box. Under this selective control, the camera solenoid is fed impulses only at the proper time to change the film for the next picture, an auxiliary shutter being provided which remains closed for the intervals during which no photographs are to be taken. When the radar set is used for sector scanning only, the camera is supplied impulses which are continuous for the duration of the clockwise sweep and off for the counterclockwise sweep, or vice versa. Under such conditions of radar operation, the camera shutter opens at the beginning of the impulse and then closes, and the camera recycles itself at the end of the impulse. In this type of operation, the camera may also be set to take pictures at the same slower rates as with continuous scanning.

*Adaptation of camera to radar*

Figure 1:
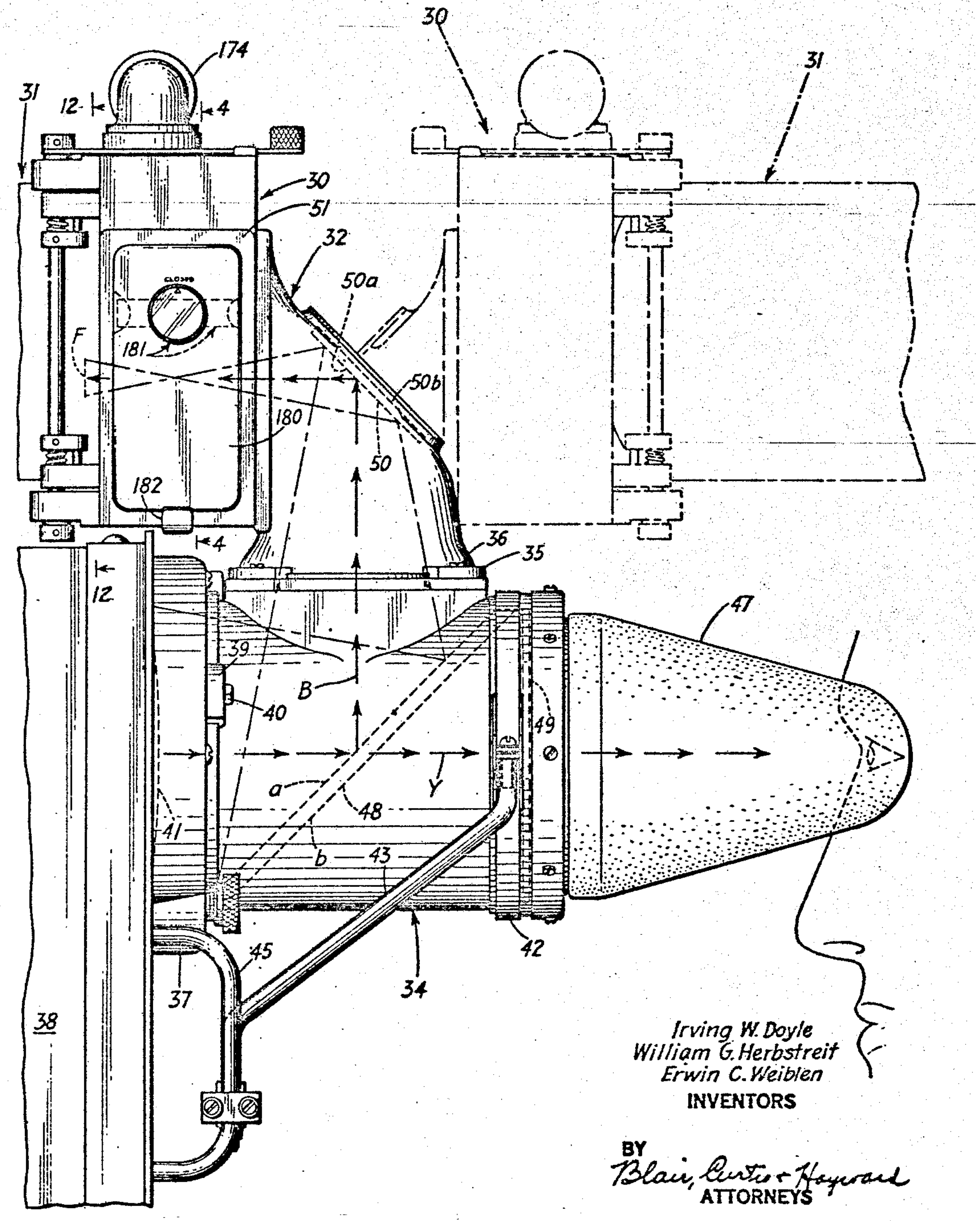
Figure 1 is a side view of the installation showing the camera mounted on a fragmentary portion of a radar set, a portion of the camera magazine being broken away.
Figure 2:
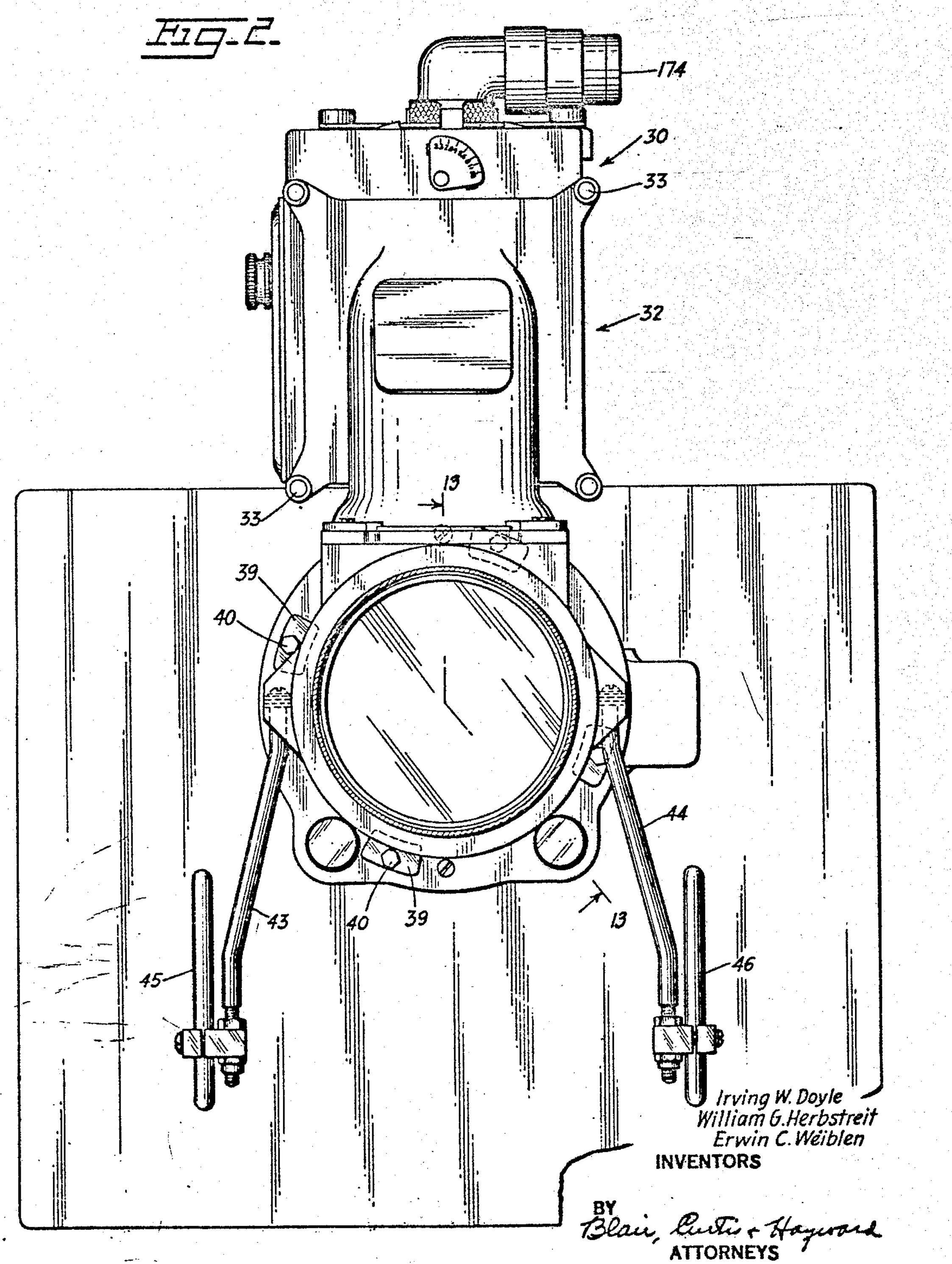
Figure 2 is a front elevation of the camera, adapter and radar set.
Figure 3:
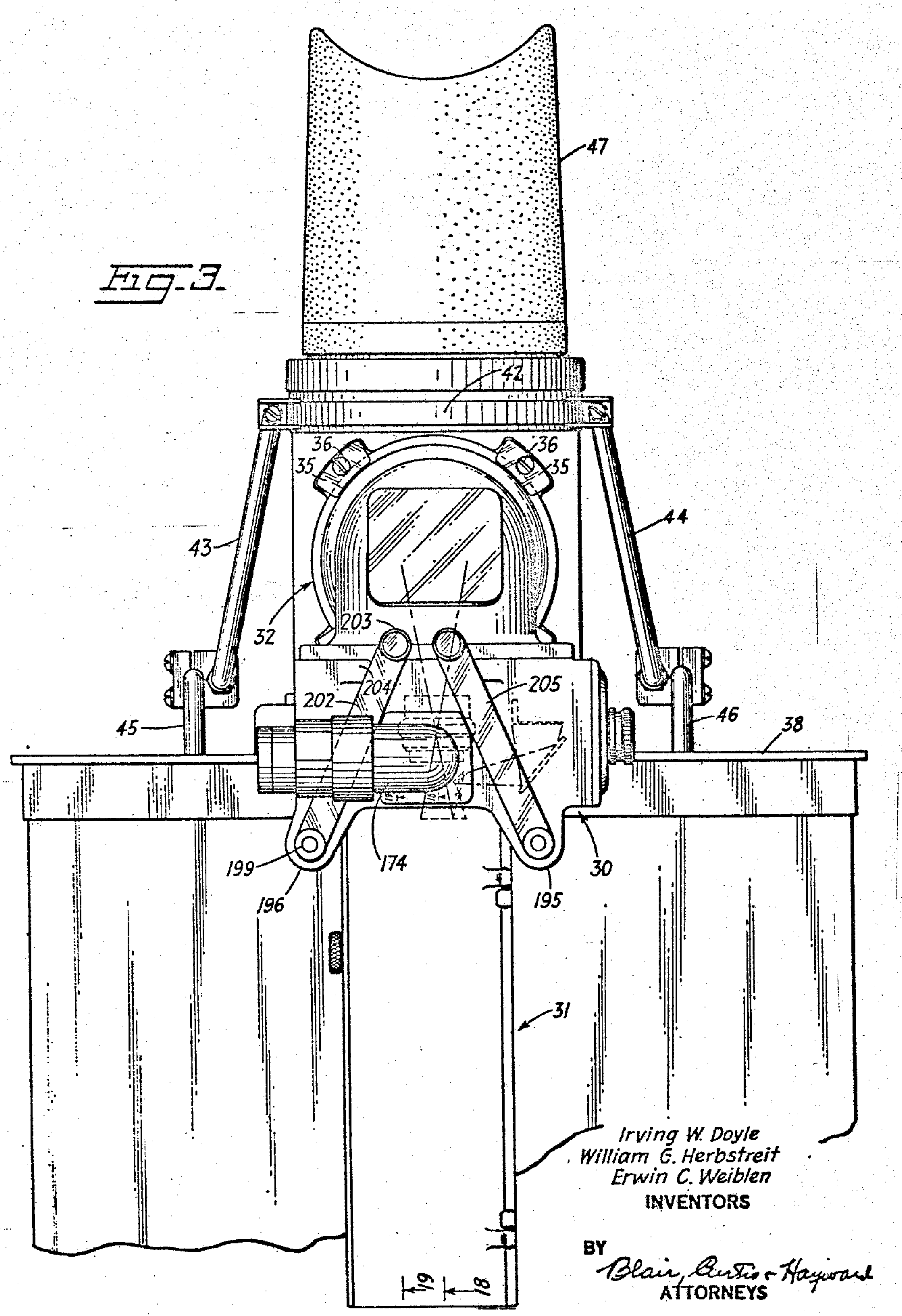
Figure 3 is a top view of the camera, adapter and radar set.

Referring first to Figures 1, 2 and 3, wherein the camera is shown in side and front elevation and plan, the camera body, which is generally indicated at 30, has detachably secured thereto a film magazine, generally indicated at 31, the camera body 30 (Figure 2) being attached to an adapter, generally indicated at 32, by illustratively four bolts 33, in such a manner that the camera body may be attached in either of two different positions, either the position shown, or a position 90° clockwise therefrom. Adapter 32 which, as shown in Figure 1, is elbow-shaped, is mounted on a casting or fitting, generally indicated at 34, by means of clamps 35 and screws 36, in such a manner that the adapter, together with the camera body and magazine, may be swiveled as a unit about the vertical axis of the adapter, between the full and broken line positions shown in Figure 1. Casting or fitting 34 is in turn secured to a portion 37 of the radar set 38, as by clamps 39 and screws 40, in such manner that it too may be swiveled around its center line which is coaxial with the axis of the radar screen 41, as desired.

The aforementioned portion 37 of the radar set may comprise a casting or adapter of any suitable form for receiving fitting 34. It will, of course, be understood that when the camera is to be attached to an instrument, or instrument panel, or other apparatus to be photographed, casting 37 may take whatever form is desirable and convenient for the particular application of the camera.

In the present instance, casting 37 rotatably supports a clear plastic plate 300 (Figure 13) which may take the form of a negative lens, for a purpose later described. On this plate 300 is engraved an arrow 301 on that side of the plate nearest the radar scope 41. A ring gear 302 is fastened to plate 300 in any suitable manner, this gear meshing with a gear 303 pinned to a shaft 304, to the outer end of which is attached an operating knob 305. Shaft 304 is suitably journaled in a portion of casting 37. Thus plate 300 may be rotated by knob 305. A second ring gear 306 carries a small pointer 307 (Figure 14), this gear being rotatable by a knob 308, which is arranged similarly to knob 305. It follows that arrow 301 and pointer 307 may be used for keeping track of the airplane's heading and its ground path or direction, for navigational purposes. The arrow and pointer are, of course, visible through viewing hood 47 (Figure 1).

An annular ring 309 (Figure 13) is supported in any suitable manner within casting 34, and surrounds plate 300. This ring 309 is formed of a blue plastic, and carries an azimuth scale engraved on its side which is adjacent to radar scope 41. The blue color of this ring provides a substantial amount of blue light for reflection by beam splitter 48 (Figure 1), but provides very little amber or red light which would be transmitted through the beam splitter 48 (Figure 1) and amber filter 49 to be visibly observed by the operator. Thus there is provided a very subdued scale for visual observation which does not detract from the main scope image. Referring back to Figure 14, a plurality of small instrument lights 310 are suitably mounted in a casting 37 adjacent ring 309 for illuminating the engraved numbers and divisional lines on the azimuth scale, while leaving the entire background dark.

As noted hereinbefore, plastic plate 300 (Figure 13) is in the form of a negative lens. As such, it comprises a correction plate which tends to produce the optical effect of flattening out the image which appears on the curved face of radar scope 41. By flattening the image to a plane, it is brought into sharp focus throughout the entire field. This is of particular advantage when the camera is applied to a radar set of high resolution.

Thus it may be seen that the camera and its associated parts are provided with great flexibility of mounting, which facilitates dodging of such obstructions in the aircraft or other environment of the camera as might otherwise preclude connection of the camera to the radar. While adapter elbow 32, as illustrated, is one of 90°, it will, of course, be obvious that elbows of other angles may be used for special installations.

To steady the above-described assembly, there is preferably provided at the right-hand end of fitting 34 (Figure 1) a band 42, to which the upper ends of a pair of angle arms 43 and 44 (Figure 2) may be secured, the lower ends of these arms being respectively fastened in any suitable manner to braces 45 and 46 attached to and extending from radar 38 (Figure 1) or any other convenient or desirable support. A viewing hood 47 is attached in any suitable manner to the right-hand end of fitting 34 (Figure 1) through which the radar operator can observe the radar scope 41.

Enclosed within fitting 34 is a beam splitter 48, the beam splitter being mounted in any suitable manner (not shown) at three points within fitting 34, in order to prevent any distortion by reason of the mounting means. The beam splitter glass may be held at these three fixed points by means of three springs (not shown) for example, which press directly opposite the contact points of such fixed points in order not to distort the glass. The surface *a* of beam splitter 48 is coated with a color selective reflection coating of a character which reflects blue light upwardly along the line B, and transmits yellow light along the line Y through fitting 34 and into hood 47, to be observed by the observer. Surface *b* of the beam splitter is given a highly efficient anti-reflection coating to prevent reflections of any sort, so far as possible, from this surface. An amber filter 49 is suitably housed in the right-hand end of fitting 34 between the beam splitter and the operator's eye position, to provide a combination of the beam splitter color selective properties and the filter color selective properties, whereby the operator sees only the persistent image produced on the face of radar scope 41, while the high intensity blue flash image is reflected upwardly, and then from a mirror 50, mounted in adapter elbow 32, into the camera lens, and thence onto the film F. On face 50*a* of mirror 50 is deposited the same selective color coating as on beam splitter face *a*, face 50*b* of the mirror being finely ground and then given an absorbent coat of optical black paint. Thus mirror 50 has color selective properties further to accentuate the color selection of the light system, and to prevent the persistent image from being photographed, and also to eliminate any trace of a ghost image which might otherwise be produced by reflection from surface *b* of beam splitter 48. Any ghost image reflected from beam splitter surface *b* would be predominantly yellow, since it would be transmitted twice through beam splitter surface *a*, and would then pass right through surface 50*a* of mirror 50 and be absorbed by the optical black paint on mirror surface 50*b*, rather than reflected into the camera lens. Still another advantage accrues to the color selective surface on mirror 50, in that it eliminates trace of fog produced by light from the airplane cabin entering the system through amber filter 49 in fitting 34.

*Film transport (Figures 4, 5, 6, 7, 8, 9 and 10)*

Figure 4:
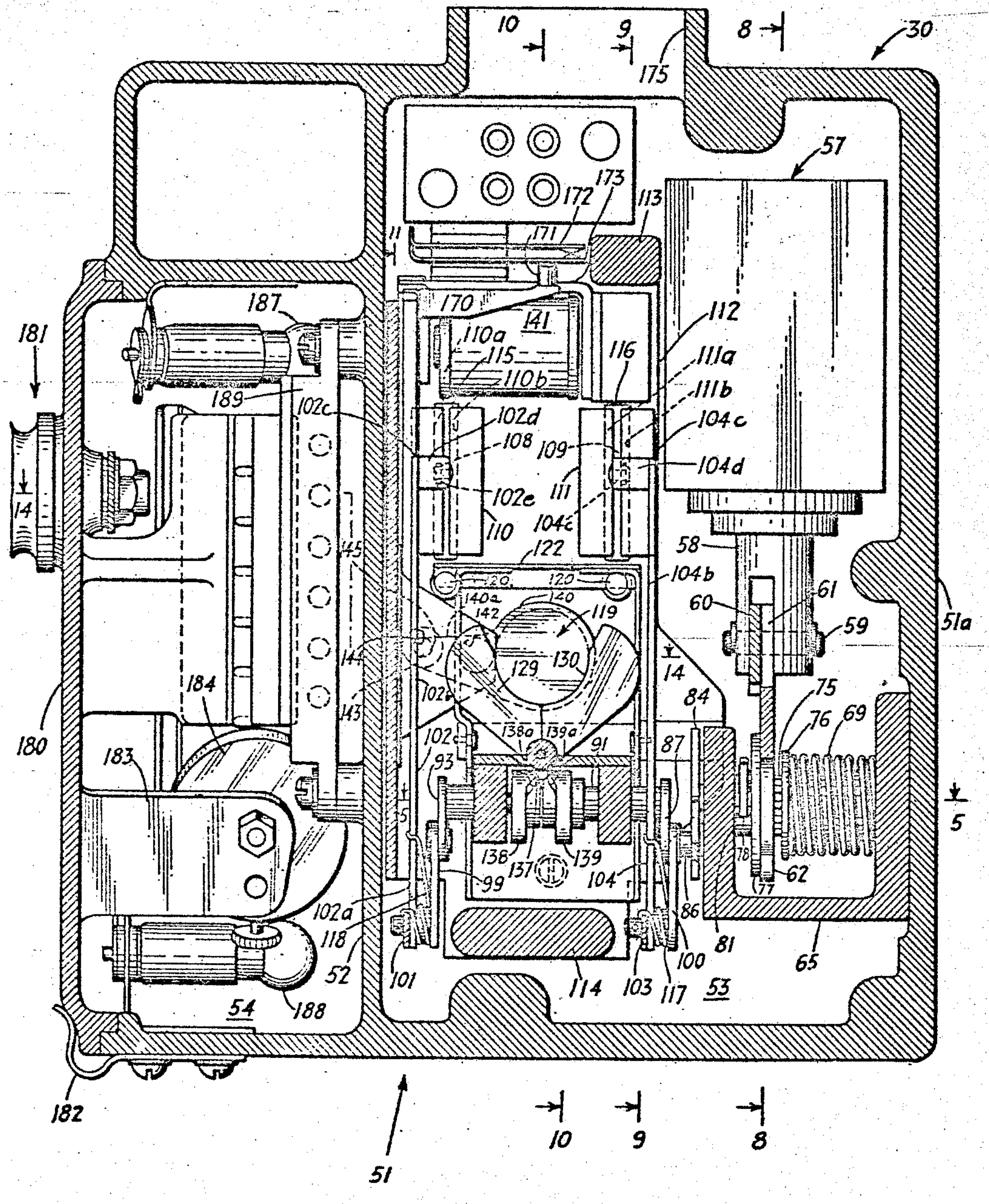
Figure 4 is an enlarged sectional elevation taken along the line 4—4 of Figure 1.

As shown in Figure 4, the main housing of camera body 30 is generally indicated at 51, this housing being partitioned by a wall 52 into two compartments 53 and 54, the former of which encloses the camera operating mechanism, and the latter of which encloses various data indicative elements. As shown in Figure 8, one side of compartment 53 is closed by a cover plate 55, which may be detachably secured to camera housing 51 in any suitable manner. Projecting inwardly of cover plate 55 is a preferably integral arm 56, on which is suitably mounted the main camera operating solenoid, generally indicated at 57. The armature 58 of solenoid 57 is bifurcated, as shown in Figure 4, and carries a pin 59 which extends through a film magazine operating link 60 (Figure 8) and an arm 61 having formed on its free end a gear sector 62. The portions of link 60 and arm 61 through which pin 59 extend are, as shown in Figure 4, disposed between the bifurcations of armature 58, the anchored ends of the yoke and arm (Figure 8) being pivotally mounted on a pin 63, carried by a lug 64 secured to and extending from cover plate 55.

Figure 7:
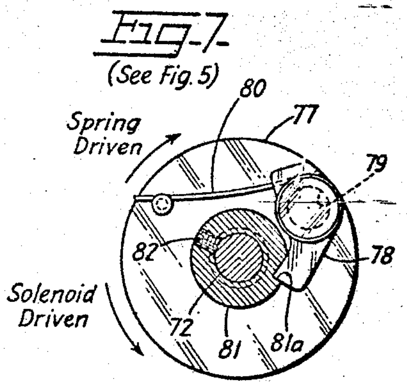
Figure 7 is a sectional elevation taken along the line 7—7 of Figure 5.

Disposed below solenoid armature 58 is a generally U-shaped bracket 65 (Figure 4) which may be secured to a wall 51*a* of housing 51 in any suitable manner. As is better shown in Figure 5, bracket 65 has secured in one side thereof a mounting plug 66, held in place as by suitable screws 67. This mounting plug carries an anti-friction bearing 68, and anchors one end of a driving spring 69. Bearing 68 journals one end 70 of a shaft 71, the other enlarged end 72 of the shaft being journaled in an anti-friction bearing 73 disposed in the opposite wall of bracket 65. A member, generally indicated at 74, is loosely mounted on shaft 71 so as to be rotatable relative thereto. This member comprises a pinion 75 in mesh with gear sector 62, a hub 76 which provides an anchor for the other end of driving spring 69, and a driving disc 77 which, as shown in Figure 7, has a pawl 78 pivotally mounted on a pin 79 carried thereby. This pawl is spring-biased clockwise by a leaf spring 80 into engagement with a collar 81 secured to shaft end 72 by a set screw 82. Collar 81 is notched as at 81*a* to receive the end of pawl 78, a driving connection between disc 77 and shaft end 72 being formed thereby.

It may now be seen that when solenoid 57 is energized by an impulse from the radar, its armature 58 is retracted. i. e. drawn upwardly, as viewed in Figure 8, so that gear sector 62 of arm 61 rotates pinion 75 counterclockwise. Of course, spring anchor 76 and driving disc 77 (Figure 5) rotate with the pinion, with the result that spring 69 is loaded by the time the solenoid armature has reached the end of its stroke. The parts are so proportioned that when the spring is thus loaded or wound, pawl 78 (Figure 7) engages collar notch 81*a* so that when the solenoid becomes deenergized at the end of the radar impulse, spring 69 is free to drive driving disc 77 and accordingly collar 81 and shaft 71 in the opposite direction. i. e. clockwise, as viewed in Figure 7. In other words, driving disc 77 is rotated counterclockwise by the solenoid during the spring winding portion of the cycle, and is subsequently spring driven clockwise upon deenergization of the solenoid at the end of the radar impulse. Of course shaft end 72 (Figure 5) is similarly driven.

The extreme left-hand end 83 of shaft 71 is riveted to a crank disc 84, which is notched as at 85 to receive the free end of a crank pin 86, secured to and projecting from a crank arm 87

Figure 5:
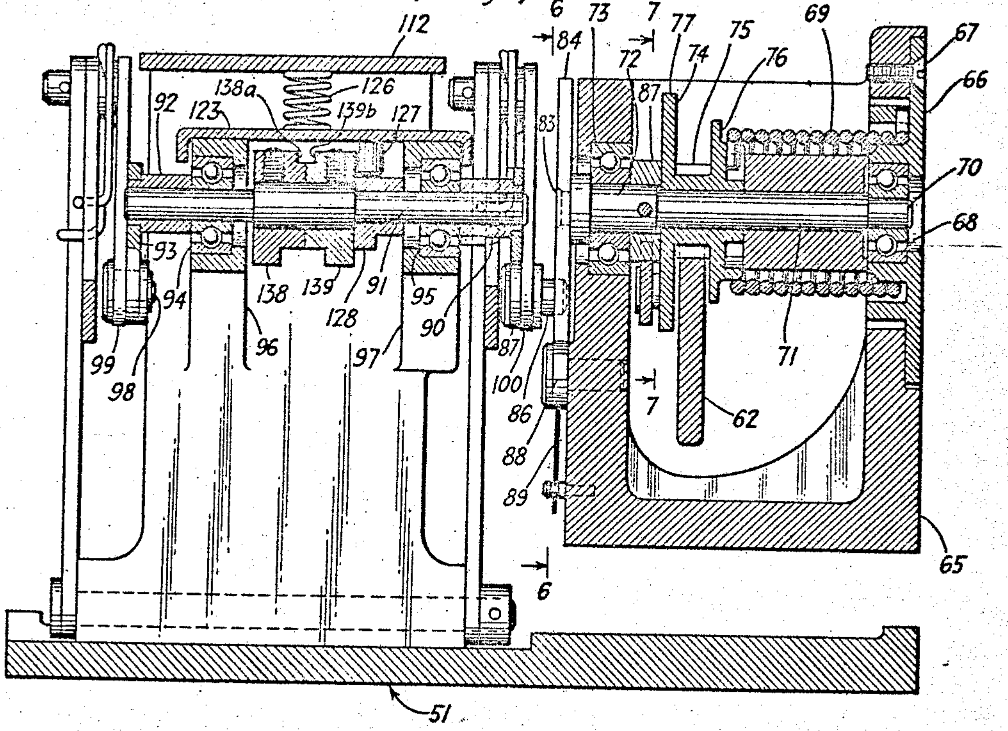
Figure 5 is an enlarged section taken along the line 5—5 of Figure 4.
Figure 6:
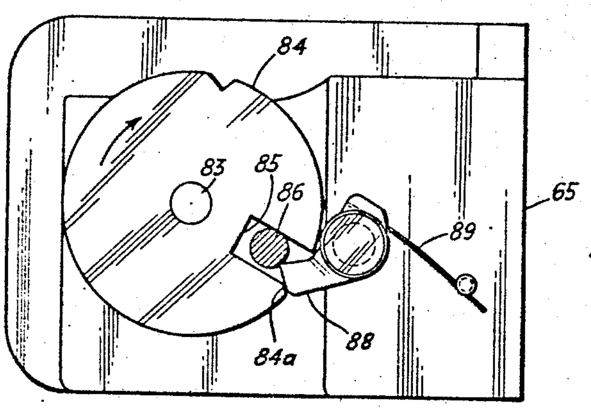
Figure 6 is a sectional elevation taken along the line 6—6 of Figure 5.

(Figures 4, 5 and 9). Crank disc 84 is milled as at 84*a* at the entrance of slot 85 to provide an abutment for the free end of a pawl 88 pivotally attached to the front face of bracket 65 and spring-biased clockwise as by a leaf spring 89. It may now be seen that when driving disc 77 is spring driven clockwise, in the manner hereinbefore described, crank disc 84 (Figure 6) is also driven clockwise past pawl 88, which rides on the surface of the disc until the end of the spring driving portion of the cycle, at which time the pawl reenters notch 85. The reentry of pawl 88 into notch 85 in juxtaposition to portion 84*a* of disc 84 precludes reverse rotation of the disc, as might otherwise result from spring backlash.

As noted hereinbefore, crank pin 86 is fastened to crank arm 87, and this crank arm, as shown in Figure 5, is fastened to a bushing 90 secured to the right-hand end of a shaft 91. To the left-hand end of this shaft is secured a similar bushing 92, to which is fastened a crank arm 93 similar to crank arm 87. Shaft 91 is journaled in anti-friction bearings 94 and 95, mounted respectively in the ends of arms 96 and 97, which extend inwardly from a wall of housing 51. The free end of crank arm 93 carries a pin 98, on which is pivoted one end of a link 99. Crank pin 86 also pivotally supports one end of a similar link 100. To the lower end of link 99 (Figure 4) are pivotally connected a lever 101 and an upwardly extending arm 102, a similar lever 103 and arm 104 being pivotally attached to the lower end of link 100. The other ends of these levers, for example lever 103 (Figure 9), are pivotally secured as by a pin 105 to cover plate 55. The aforementioned arms, for example arm 104, includes a rearwardly extending portion 104*a*, a vertical portion 104*b*, and a horizontal portion 104*c* which, as shown in Figure 4, is bent transversely as at 104*d* and thence frontwardly as at 104*e* to terminate in a pointed film claw 106 (Figure 9). Arm 102 (Figure 4) similarly includes a rearwardly and upwardly extending portion 102*a*, a vertical portion 102*b*, a horizontal portion 102*c*, a transversely bent portion 102*d* and a forwardly extending portion 102*e*, the end of which also comprises a pointed film claw 107 (Figure 12). Secured respectively to the forwardly extending portions 102*e* and 104*e* (Figure 4) of arms 102 and 104 are rollers 108 and 109, adapted to ride respectively against guide plates 110 and 111 which are secured to a front mounting plate 112 (Figures 9 and 10) secured at the top and bottom, respectively, to forwardly extending arms 113 and 114 (Figure 10) which are preferably integral with cover plate 55. This front plate 112 (Figure 4) has rectangular cutouts 115 and 116, through which project forwardly extending portions 110*a* and 110*b* of guide plates 110, and the forwardly extending portions 111*a* and 111*b* of guide plates 111. These forwardly extending portions of the guide plates are spaced as shown, and provide guide slots respectively for film claws 106 and 107 (see Figures 9 and 10).

From the foregoing, it will be seen that the film transporting claws 106 and 107 are operated as follows: When crank arm 87 (Figure 9) is rotated in the manner hereinbefore described, it revolves clockwise, as viewed in this figure, thus driving links 99 and 100 (Figures 4) downwardly to depress levers 101 and 103. As these levers are depressed, arms 102 and 104, and accordingly the film claws on the ends thereof, are drawn downwardly. It might here be noted that each arm and lever set, e. g. arm 104 and lever 103, are biased away from one another by a suitably arranged spring 117, the other arm and lever set being similarly biased apart by a similar spring 118 (Figure 4), these springs maintaining the film claw rollers 108 and 109 in engagement with their respective sets of guide plates 110 and 111, and accordingly tending to force the film claws into the perforations of the film. During the downward stroke of the film claws as described, they ratchet past the film perforations as they are being drawn downwardly in a direction opposite to the direction in which the film is to be transported. Thus at the end of about 90° of angular movement of crank arms 87 and 93, the two sets of links, levers and arms, e. g. link 100, lever 103 and arm 104 (Figure 9) commence to move upwardly with the film claws extending through opposed film perforations. As the film claws are moved upwardly, the film is transported by an amount equivalent to the full stroke of the claws, after which the crank arms again draw the claws downwardly until they arrive at the rest position shown in Figure 9, this position coinciding with the end of the driving cycle of spring 69 (Figure 4).

Figure 10:
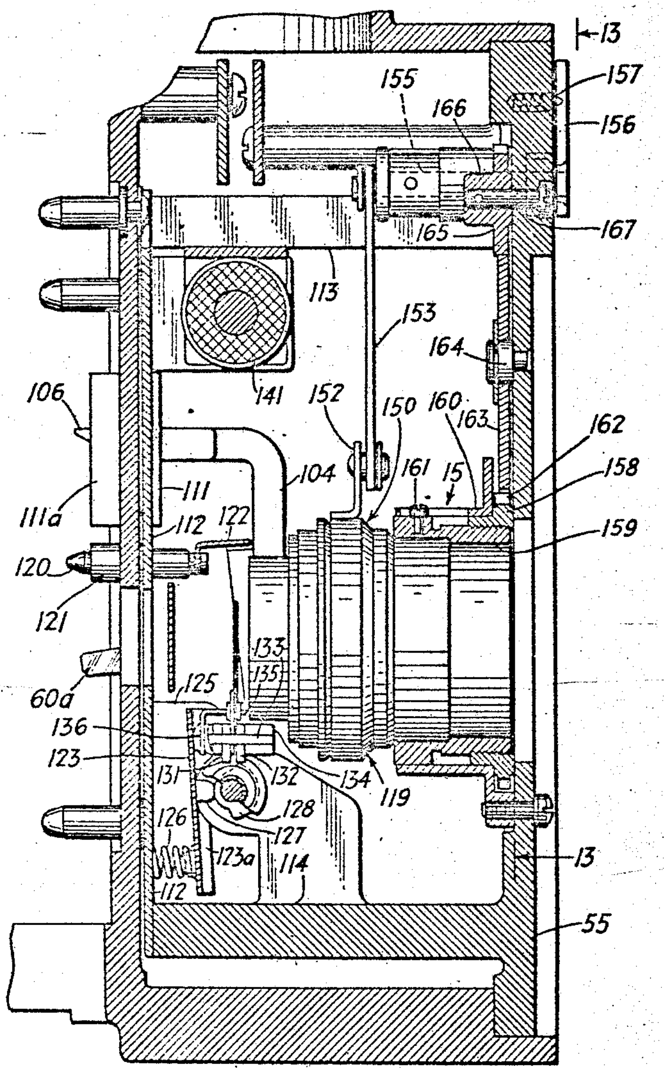
Figure 10 is a sectional elevation taken along the line 10—10 of Figure 4.
Figure 15:
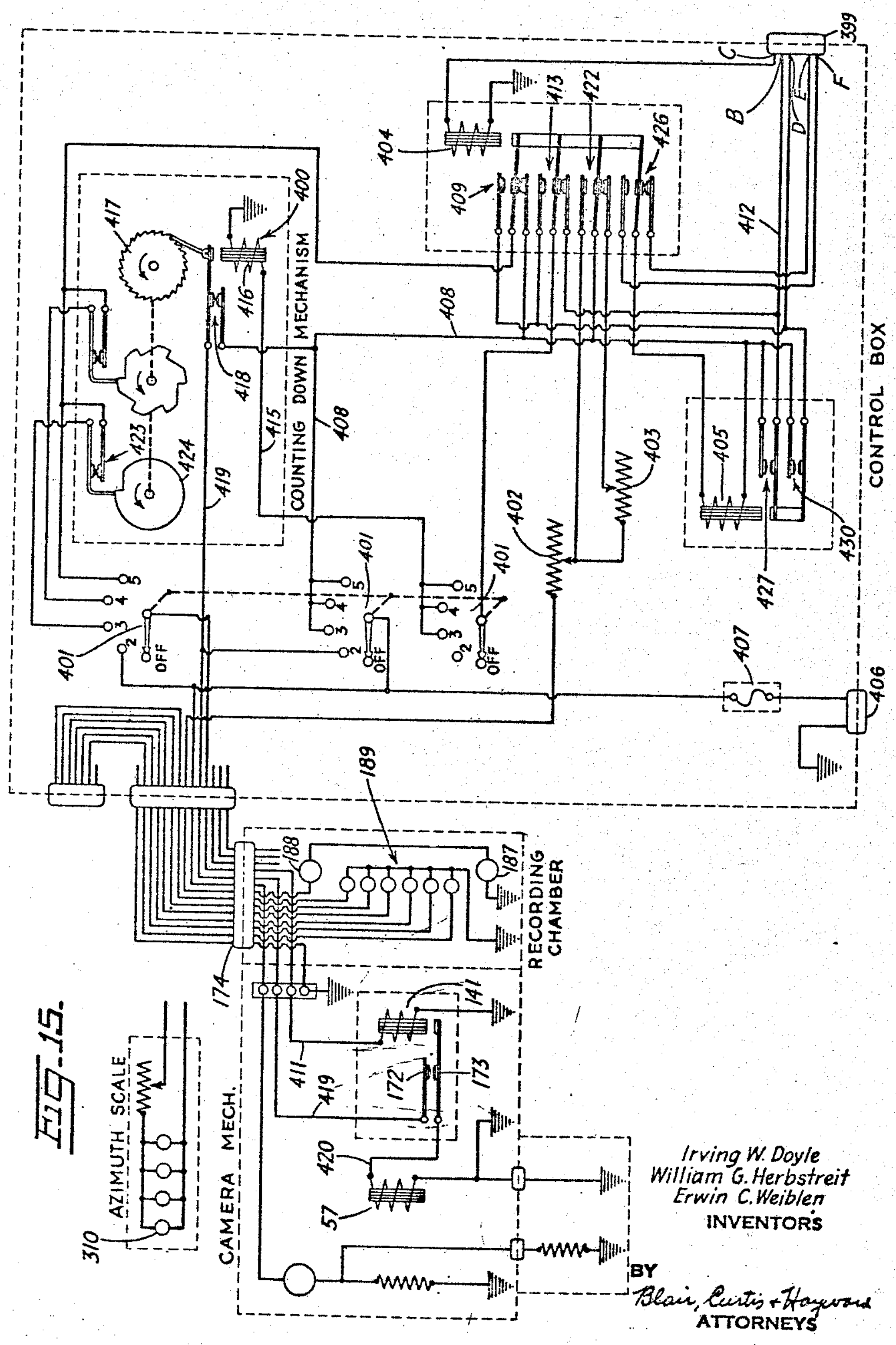
Figure 15 is a schematic wiring diagram of the camera and control box circuits.

In order to assure that each successive frame of the film is properly located in relation to the camera lens, which is generally indicated at 119 (Figure 10), we have provided a film registering device, which also serves the added purpose of maintaining the film motionless during the exposure period. This device includes a pin 120 (see also Figure 9) which is reciprocably mounted in a bushing 121 extending through the front wall 51*a* of camera housing 51, and is carried by front plate 112. The inner end of pin 120 is slotted to receive the bent-down end of an arm 122, whose other end is fastened to the top of a rocker arm 123, pivotally mounted as at 124 on the free end of a lug 125, secured to and extending inwardly from front plate 112. As shown in Figure 10, the lower end 123*a* of rocker arm 123 carried one end of a spring 126, the other end of which abuts and is carried by front plate 112, spring 126 putting the rocker arm under a constant counterclockwise bias, as viewed in this figure. Also secured to rocker arm 123 is a button 127 (see Figure 5) which is held against the surface of a cam 128 by spring 126, this cam being secured to shaft 91 so as to rotate therewith. Thus it follows that when cam 128 rotates with the shaft during the film transport portion of the operative cycle, the cam rocks rocker arm 123 clockwise, as viewed in Figure 10, so that pin 120 is withdrawn from that perforation of the film through which it extended prior to the beginning of the film transport portion of the cycle. In other words, the registering pin 120 is withdrawn during the first 90° of movement of crank arm 87 (Figure 9) during which the film claws are being drawn downwardly, so that the film does not start to move until the registering pin, of which, incidentally, there are two, as shown in Figure 15, is withdrawn from the film. In connection with the operation of the film claws and film registering pins, it should be noted that the film magazine is conditioned for operation by the upward movement of fork 60 (Figure 8) during the initial portion of the operative cycle, as will be described in detail hereinbelow.

*Shutter operation*

The camera shutter comprises a pair of blades 129 and 130 which, in Figure 4, are shown in open position relative to the aperture of lens 119.

These blades are connected respectively to collars 131 and 132 (Figure 10) pivotally mounted on a pin 133 carried by a support 134. Each shutter blade has connected thereto one end, such as end 135, of a spring 136, mounted on the end of pin 133, these ends of the spring constantly biasing the shutter blades toward one another, i. e. shutter blade 129 is under a clockwise bias, while blade 130 is under a counterclockwise bias, as viewed in Figure 4. The blades are, of course, sufficiently offset with respect to their common pivotal axis, so as readily to pass one another during closing and opening movement.

Extending downwardly from each of the shutter blades as, for example, blade 129 (Figure 4) is an ear 137 which projects between a pair of cams 138 and 139 mounted on shaft 91, so as to rotate therewith. These cams are so contoured as to have inwardly extending lobes 138*a* and 139*a* which, when they engage the shutter blade ears 137, swing the blades into the Figure 4 position against the bias of the blade closing spring described. Of course, when the cams rotate with shaft 91 to the point where the lobes 138*a* and 139*a* are rotated away from the blade ears, the shutter blades may close under the bias of their spring. These cams are also shown in Figure 5.

It may now be seen that during the first 90° or so of motion of crank arms 87 and 93 (Figures 4 and 9), and accordingly of shaft 91, shutter blades 129 and 130 (Figure 4) are closed, it being remembered that during this initial 90° of movement, the film claws are being drawn down to the beginning of their film transporting stroke. During the next 180° or so of rotation of the crank arms, the shutter leaves remain closed and the registering pins 120 are retracted from the film perforations. During this 180° of movement, the film claws move upwardly to transport the film, thereby carrying an unexposed frame into juxtaposition with the aperture of the camera lens. During the final 90° of rotation of the crank arms and shaft 91, the film claws are again returned to their starting position, i. e. that position shown in Figure 9, the registering pins 120 reenter perforations of the film, and cams 138 and 139 reopen shutter blades 129 and 130.

*Capping shutter*

Figure 11:
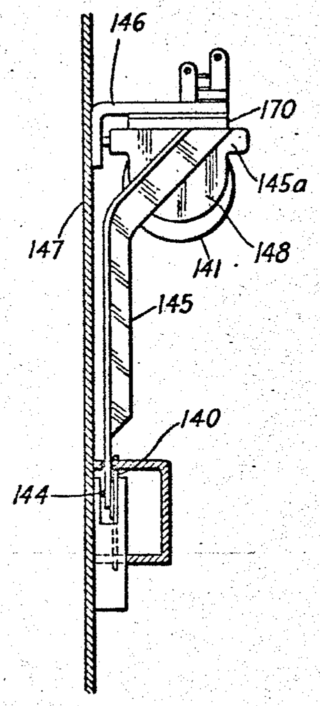
Figure 11 is a vertical section taken along the line 11—11 of Figure 4.

An auxiliary capping shutter 140 (Figures 4 and 11) is provided to prevent exposure during the intermediate intervals when the camera is used on the lower speeds, and during the intermediate sectors when the radar system is sector scanning, as hereinbefore described. The enlarged end of capping shutter 140 (Figure 4) overlies the aperture of lens 119 when the shutter is closed, the capping shutter also including a neck portion 140*a* which overlies the auxiliary lens system 142 when closed. Capping shutter 140 is pivotally carried by a suitably supported pin 143, and has extending from its pivoted end a crank pin 144 (Figure 11) which is received in the bifurcated end of an upwardly extending arm 145. The upper end 145*a* of arm 145 is pivotally secured in any suitable manner to a bracket 146, fastened to a rearwardly bent flange 147 of face or mounting plate 112. Arm 145 also carries a plate 148 associated with the armature of a solenoid 141 (see Figure 4). When this solenoid is energized, arm 145 is rocked counterclockwise, as viewed in Figure 4, so that through the medium of its forked end and shutter pin 144, capping shutter 140 is rocked clockwise to uncover the aperture of lens 119 and lens system 142. As will be pointed out in detail hereinafter, solenoid 141 is constantly energized during high speed operation of the camera, i. e. when the camera is operating to take a photograph of every scan, so that the capping shutter 140 is constantly open. When, however, the camera is set to operate periodically, i. e. to take one picture out of every ten scans, or one out of every sixty, the capping shutter 140 remains closed for the intervals during which no photographs are to be taken.

Fastened to, or integral with arm 145 (Figures 4 and 11) is an arm 170, carrying a button 171 (Figure 4) which button underlies a pair of switch contact arms 172 and 173. This switch is in the circuit of solenoid 57. Thus, as will be detailed hereinafter, energization of solenoid 141 and the consequent closing of switch arms 172 and 173 precede energization of solenoid 57. In other words, before the camera solenoid 57 can be energized to recycle the camera in the manner described, solenoid 141 must first be energized to effect opening of capping shutter 140, as it would be pointless to recycle the camera without a picture having been taken. The electrical connections for the camera circuit are brought in by a connector socket 174, which is received in an opening 175 formed in the top of camera housing 51 (see also Figures 1, 2 and 3).

*Camera circuit*

Figure 16:
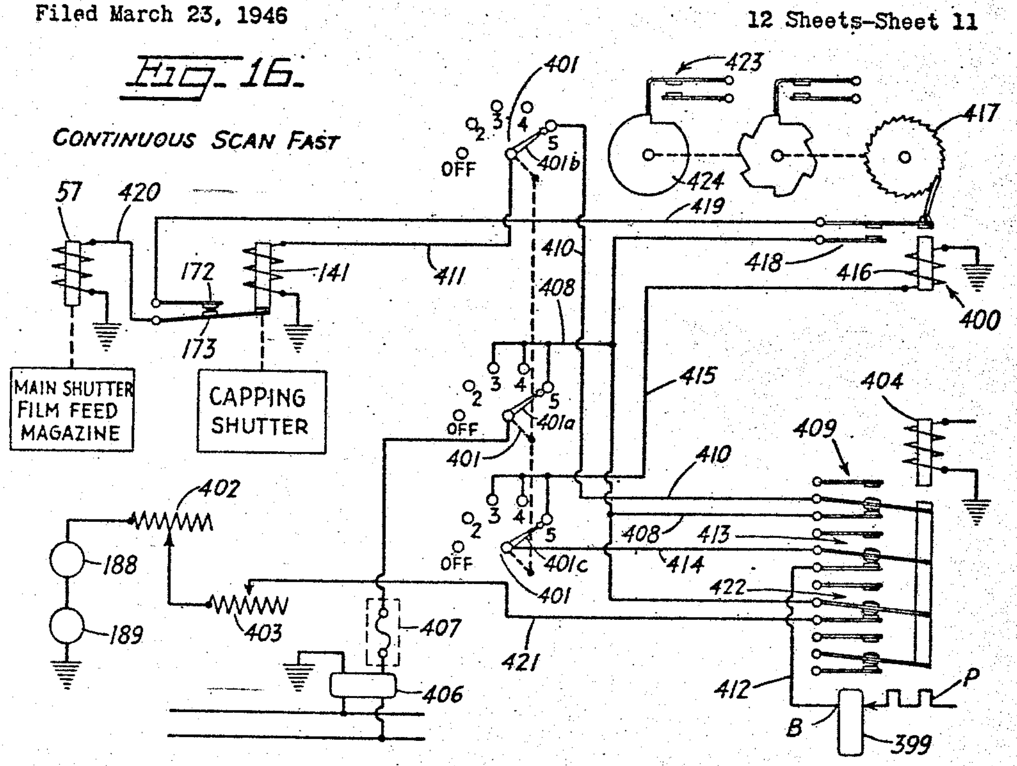
Figure 16 is a schematic wiring diagram of a portion of the camera and control box circuits under one condition of operation.
Figure 17:
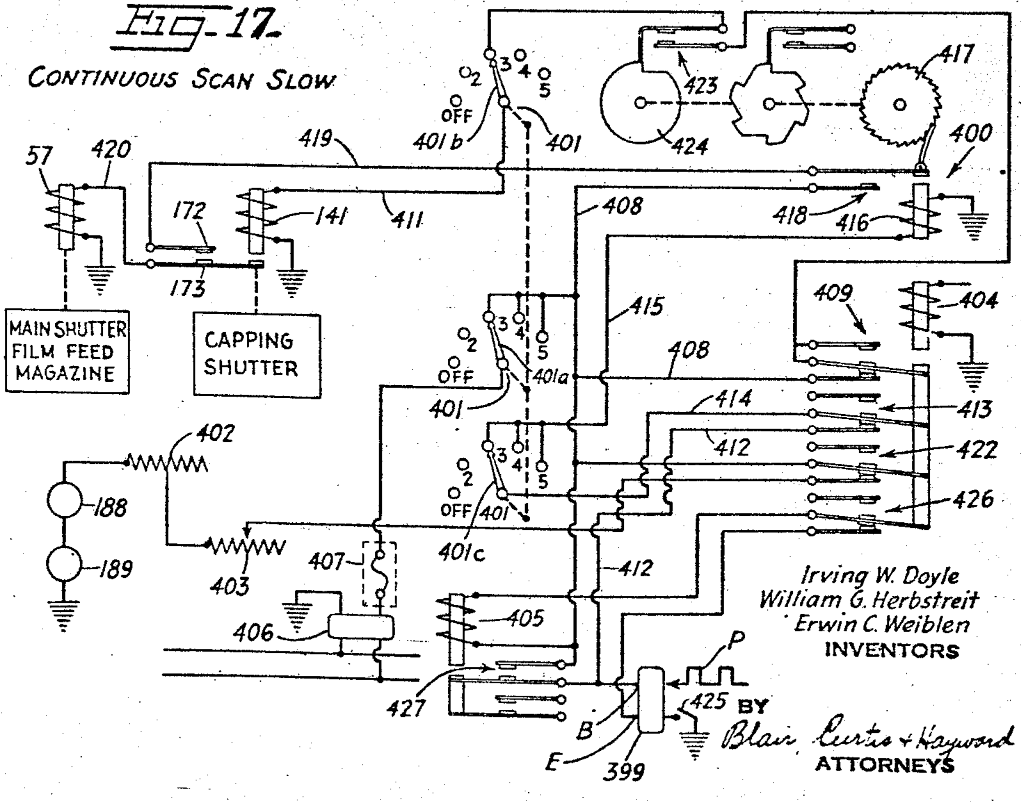
Figure 17 is a schematic wiring diagram of a portion of the camera and control box circuits under another condition of operation.
Figure 18:
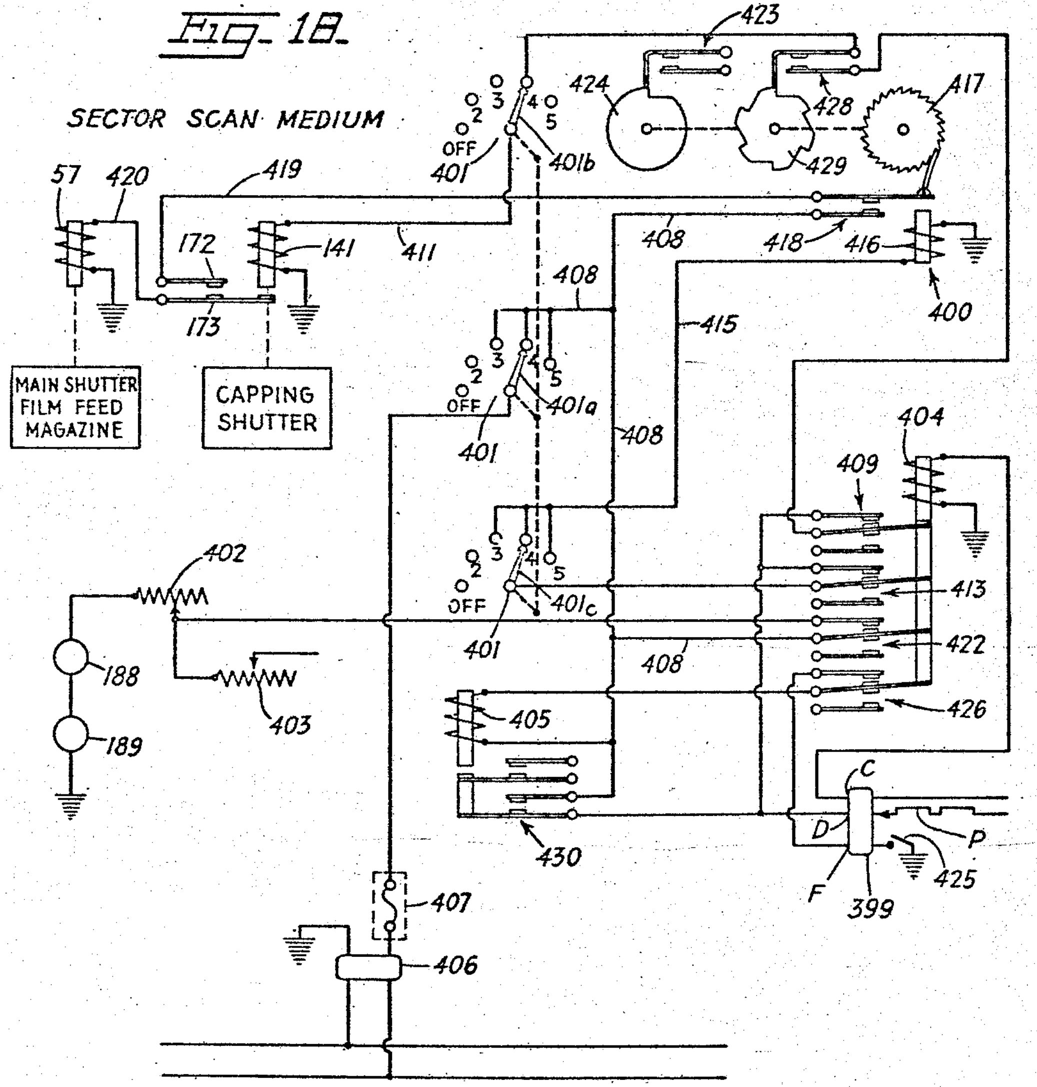
Figure 18 is a schematic wiring diagram of a portion of the camera and control box circuits under still another condition of operation.

The camera circuit, together with that in the control box, and the connections to the radar set, is shown in Figure 15, Figures 16, 17 and 18 illustrating different operative conditions of the circuit in accordance with control box settings. Thus Figure 16 illustrates the circuit diagram representing the condition when the cathode ray oscilloscope is continuously scanning and the camera is operating at its fastest speed, i. e. a photograph being taken each time a pulse is applied to the appropriate terminal. Figure 17 illustrates the operative leads when the camera is set to make one exposure for every sixty sweeps of the radar screen. In Figure 18 the circuit is shown in condition for photographing the radar scope at medium speed, e. g. for every tenth sweep of the radar screen, when the radar is set for sector scanning.

Thus in Figure 15 we have shown the electrical circuits for automatically actuating the camera mechanism in accordance with the radar sweep system, there being included an external adjustment or control box for regulating the repetition rate of making exposures.

Synchronizing pulse signals from the radar system are applied to a connector 399 and actuate a counting down mechanism, generally indicated at 400, which provides electrical contacts in accordance with the position of a selector switch 401 to make a photographic exposure for each sweep of the radar screen, or for each tenth sweep, or for each sixtieth sweep. The relay or solenoid 141 and camera solenoid 57 directly control the camera action, as hereinbefore described, and are, in turn, controlled by the incoming pulse synchronizing signals and counting down mechanism 400. Relay 404 makes all the necessary circuit changes for photographing the radar screen when using either sector or continuous scanning.

Selector switch 401 has five positions, off, on, slow, medium and fast. In the off position, all power is removed from the camera actuating mechanism. In position 2, the camera mechanism is actuated and the shutter remains in the open position so long as the selector switch is in that position. The (slow) position 3 provides for making one exposure for each sixty sweeps on the radar screen. The (medium) position 4 provides for making one exposure for each ten sweeps on the radar screen, and in (fast) position 5, an exposure is made for each sweep. An internal relay mechanism 405 permits the use of an external synchronized switch connection to be used instead of 24 volt synchronizing pulses, where such pulses are not readily available from the radar system.

The only power requirements for this circuit other than the synchronizing pulses is 24 volts D. C., which is provided through a connector 406.

Figures 16, 17 and 18 show various portions of the complete circuit of Figure 15 for the purpose of illustrating various conditions of operation. In general all connections not essential to operation under the particular condition being represented have been eliminated.

Figure 16 shows the basic circuit diagram representing the condition when the cathode ray oscilloscope is continuously scanning and the camera is operating at its fastest speed, i. e. a photograph is taken each time a pulse P is applied to terminal B of connector 399. Switch 401 is shown in the upper switch position for this operation. 24 volts D. C. is applied to the circuit from the mains through terminal 406, fuse 407 to arm 401*a* of switch 401. This voltage is applied to relay coil 141 through the circuit including lead 408, relay contact 409, lead 410, switch arm 401*b* and lead 411. Thus for this condition of operation coil 141 is continuously energized, thus maintaining the capping shutter in an open position.

A 24 volt pulse signal is externally generated in the radar system in synchronism with the sweep circuit in such manner that one pulse is generated for each complete radar sweep. This signal is applied to terminal B of connector 399 through lead 412, relay contact 413, lead 414, switch arm 401*c* and lead 415 to relay coil 416 of counting down mechanism 400, which is thus energized each time a synchronizing pulse is received. Each time coil 416 is energized, the associated mechanism moves a ratchet wheel 417 one-sixtieth of a revolution and simultaneously closes a contact 418 which energizes camera solenoid 57 by a circuit which may be traced from the D. C. mains through terminal 406, switch arm 401*a*, lead 408, relay contact 418*a*, lead 419, contacts 172 and 173 which are maintained in a closed position by relay coil 141, and a lead 420. Operating potentials for illuminating lamps 188 and 189 may be traced through rheostats 402 and 403, a lead 421, relay contact 422, lead 408, switch arm 401*a* and terminal 406 to the 24 volt supply.

In this condition of operation relay coil 404 is not energized and contacts 409, 413, and 422 remain in the position shown. Relay coil 141 is continuously energized, thus maintaining contacts 172 and 173 closed, and the capping shutter open; relay coils 416 and 57 are momentarily energized each time the external pulse signal is applied to terminal B. Thus for a complete sweep of the radar screen the shutter remains open and the film is exposed throughout the cycle. At the end of the sweep, solenoid 57 is deenergized, rewinding the camera, and momentarily preventing exposure while moving the film to the next frame, as previously described.

In Figure 17, switch 401 is set in a position for making one exposure for every 60 sweeps of the radar screen. Relay contacts 418 are again closed for each applied pulse P. However, this can result in energization of solenoid 57 only if contacts 172 and 173 are closed. A pair of contacts 423 are connected in series with the supply voltage for coil 141 which closes contacts 172 and 173, and are closed for the time interval between two successive pulses, once for each revolution of a cam 424, connected to and driven by ratchet 417. Thus when a pulse signal P is received, closing contacts 423, relay 141 is actuated, opening the capping shutter, closing contacts 172 and 173, and energizing camera solenoid 57; the next applied pulse P opens contacts 423, causing the capping shutter to close, and deenergizes solenoid 57 and also the coil 141, causing the capping shutter to close, and rewinding of the camera and moving the film to the next frame. The camera mechanism remains in this condition until coil 416 has been energized by 60 incoming pulses, resulting in one complete revolution of cam 424 when the entire process is repeated.

An additional portion of the circuit is shown in this figure which permits external synchronization when 24 volt pulses are not available by generating the necessary pulse voltage within the circuit. This is accomplished by closing a switch 425, connected between terminal E of connector 399 and ground, momentarily once each sweep cycle. Relay coil 405 is connected to the 24 volt D. C. supply through switch 401 and through contact 426 to ground through the external switch 425. Thus coil 405 is energized whenever switch 425 is closed. Contacts 427, normally open, and controlled by relay coil 405, are connected between terminal B and the 24 volt supply, thus applying the 24 volt pulse to terminal B whenever switch 425 is momentarily closed, energizing coil 425 and closing contacts 427. It is to be noted that either method of synchronization may be used without any internal switching of the circuit shown.

In Figure 18 the circuit is shown in condition for photographing the radar indicator tube when sector scan sweeping is employed. Switch 401 is in the medium sweep position and will, for example, photograph every tenth sweep of the radar screen. Relay coil 404 is continuously energized for this application by applying 24 volts D. C. to terminal C of connector 399. The associated relay contacts 409, 413, 422 and 426 are shown in the proper position for this mode of operation. The synchronizing pulse signal P is applied to terminal D, and the external radar circuit maintains a 24 volt potential during the entire sweep through the sector in one direction, and maintains zero voltage on terminal D through the entire return sweep. As in the previous example, it is necessary in order to make any exposure that contacts 428 and 172 and 173 be closed, and that relay coil 141 be energized. Contacts 428 are closed by the action of a cam 429 connected to and driven by ratchet 417 during one sector sweep out of each ten sweeps on the radar scope. The voltage from the applied pulse P (terminal D) is connected through relay contact 409, contacts 428 and switch arm 401*b* to relay coil 141. Thus whenever contacts 418 are closed and contacts 172 and 173 are closed by the action of coil 141, solenoid 57 is energized; contacts 418 are closed whenever a positive synchronizing voltage is applied to terminal D, and thus each time the camera is actuated upon energization of coil 141, the recycling mechanism associated with solenoid 57 is actuated. Energization of coil 404 causes the supply voltage to be applied to indicator lamps 188 and 189 through rheostat 402, rather than through the two rheostats in series, thus increasing the intensity of the lamps to provide optimum light for this shorter exposure. As in the previous example, an external switching circuit may be used for synchronization by connecting terminal F to ground during each positive sweep of the sector and disconnecting it during the return sweep. Closing of switch 425 energizes coil 405, closing contacts 430, thereby applying 24 volts D. C. to terminal D, thus generating internally a pulse identical with that previously applied to terminal D from the external source.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

We claim:

1. In apparatus of the character described, in combination, means including a condition determining instrument having means for periodically transmitting an electrical impulse and also having indicating means for giving a visual indication of successive instantaneous values of the condition, a camera connected to said instrument for taking successive pictures of said indicating means, a first shutter in said camera, means to operate said shutter including a solenoid, said means upon energization conditioning said shutter operating means for subsequent shutter operation, a second shutter in said camera, means including a second solenoid which upon energization effects operation of said second shutter, a circuit for said first solenoid including a pair of switches connected in series, means responsive to energization of said second solenoid for closing one of said switches, and means responsive to an impulse from said instrument for closing the second of said switches, thereby to effect energization of said first solenoid and accordingly condition said first shutter operating means for operation of said first shutter.

2. Apparatus according to claim 1 wherein the means for operating the first shutter includes a spring driven member for opening the shutter, spring driven means for closing said first shutter, and means forming an operative association between both of said spring driven means whereby operation of one positively moves said shutter into one of its positions and increases the driving bias of the other spring driven means.

3. Apparatus according to claim 1 wherein the operating means for said first shutter includes a rotatable shaft, means carried by said shaft and associated with said shutter for positively driving said shutter into one position, spring means connected to said shutter for driving it into another position, means including a loadable spring and connected to said shaft to effect rotation thereof upon release of said spring thereby to drive said shutter into its said first position against the driving bias of said spring means.

4. In apparatus of the character described, in combination, means including a condition determining instrument adapted periodically to transmit an electrical impulse, said instrument having indicating means for giving a visual indication of an instantaneous value of the condition, a camera for taking successive pictures of said indicating means, said camera being of the type wherein strip film is moved intermittently past an aperture, means in said camera for moving the film intermittently past said aperture, a solenoid in said camera connected to said film moving means for effecting operation thereof when the solenoid is energized, a circuit for said solenoid, including a first and a second normally open switch, means responsive to impulses received from said impulse transmitting means for closing one of said switches to condition the circuit of said solenoid for later energization, and means operated by said last-mentioned means for closing said other switch at predetermined intervals of greater duration than the intervals between successive impulses, thereby to effect energization of said solenoid whereby the camera is periodically operated at intervals greater than those between successive impulses.

5. In apparatus of the character described, in combination, means including a condition determining instrument adapted periodically to transmit an electrical impulse, said instrument having indicating means for giving a visual indication of an instantaneous value of the condition, a camera for taking successive pictures of said indicating means, said camera being of the type wherein strip film is moved intermittently past an aperture, means in said camera for moving the film intermittently past said aperture, a solenoid in said camera connected to said film moving means for effecting operation thereof when the solenoid is energized, a circuit for said solenoid, including a first and a second normally open switches, means responsive to impulses received from said impulse transmitting means for closing one of said switches to condition the circuit of said solenoid for later energization, means operated by said last-mentioned means for closing said other switch at predetermined intervals of greater duration than the intervals between successive impulses, thereby to effect energization of said solenoid and accordingly operation of said camera at intervals greater than those between successive impulses, and means for varying the duration of the interval between successive camera operations.

6. In apparatus of the character described, in combination, means including a condition determining instrument adapted periodically and regularly to transmit an electrical impulse, said instrument having indicating means for presenting a visual indication of an instantaneous value of the condition, a camera of the type wherein strip film is moved intermittently past an aperture for taking successive pictures of said indication, means in said camera for moving the film intermittently past said aperture, electrically operated motor means in said camera connected to said film moving means for effecting operation thereof when said motor means is energized, a circuit for energizing said motor means including a first and a second switch means, each of said switch means having open and closed positions, said switch means being connected in said circuit to permit energization of said motor means when said first and second switch means are actuated to their closed positions, means responsive to impulses received from said impulse transmitting means for independently closing said first switch means, and means operated by said last-mentioned means for closing said second switch at predetermined intervals of greater duration than those between successive impulses, thereby to effect energization of said motor means whereby said film moving means is operated periodically at intervals greater than those of successive impulses.

7. In apparatus of the character described, in combination, means including a condition responsive instrument adapted to transmit successive electrical impulses at regular intervals, said instrument having indicating means for producing a visual presentation that is a function of the instantaneous value of said condition, a camera of the type wherein strip film is moved intermittently past an aperture for taking successive pictures of said visual presentation, means in said camera for moving said film intermittently past said aperture, electrically operated motor means connected to said film moving means for effecting operation thereof when said motor means is energized, an electrical circuit for energizing said motor means when said circuit is completed, a first switch means in said circuit responsive to each of said impulses for partially completing said electrical circuit, and a second switch means in said circuit in series with said first switch means and responsive to a predetermined proportion, less than unity, of said impulses for completing said partially completed circuit, thereby to effect energization of said motor means at intervals greater than those between successive impulses.

8. In apparatus of the character described, in combination, means including a condition responsive instrument adapted to transmit successive electrical impulses, said instrument having indicating means for producing a visual presentation that is a function of the instantaneous value of said condition, a camera of the type wherein strip film is moved intermittently past an aperture for taking successive pictures of said visual presentation, means in said camera for moving said film intermittently past said aperture, electrically operated motor means connected to said film moving means for effecting operation thereof when said motor means is energized, an electrical circuit for energizing said motor means when said circuit is completed, a first, a second, and a third normally open switch means in said circuit, means responsive to each of said impulses for cyclically operating said first switch to partially complete said electrical circuit, means cyclically actuating said second switch in response to a plurality of cycles of operation of said first switch, and means responsive to actuation of said second switch for closing said third switch to complete cyclically said electrical circuit thereby to effect energization of said motor means at intervals greater than those between successive impulses.

9. In apparatus of the character described, in combination, means including a condition determining instrument adapted periodically to transmit an electrical impulse, said instrument having indicating means for presenting a visual indication of an instantaneous value of the condition, a camera for taking successive pictures of said indication, said camera being of the type wherein strip film is moved intermittently past an aperture, first and second normally-closed aligned shutters in said camera for permitting exposure of said film when both of said shutters are actuated to the open position, a first magnetic motor for opening said second shutter, means including a second magnetic motor for effecting operation of said first shutter, a first electrical circuit for energizing said first motor and including a first normally open switch, a second electrical circuit for energizing said second motor and including a second switch responsive to each of said impulses and a third switch responsive to energization of said first motor, and a counting down mechanism responsive to actuation of said second switch for actuating said first switch at intervals greater than the interval between successive impulses, thereby to actuate both of said shutters to the open position at successive periodic intervals greater than the interval between successive impulses.

10. In apparatus of the character described, in combination, means including a condition determining instrument adapted periodically to transmit an electrical impulse, said instrument having indicating means for presenting a visual indication of an instantaneous value of the condition, a camera for taking successive pictures of said indication, said camera being of the type wherein strip film is moved intermittently past an aperture, first and second normally-closed aligned shutters in said camera for permitting exposure of said film when both of said shutters are actuated to the open position, a first magnetic motor for operating said second shutter, a second magnetic motor for effecting operation of said first shutter and for moving the film intermittently past said aperture, a first electrical circuit for energizing said first motor and including a first normally open switch, a second electrical circuit for energizing said second motor and including a second switch responsive to each of said impulses and a third switch responsive to energization of said first motor, and a counting down mechanism responsive to actuation of said second switch for actuating said first switch at intervals greater than the interval between successive impulses, thereby to move said film and to actuate both of said shutters to the open position at intervals greater than the interval between successive impulses.

11. In apparatus of the character described, in combination, a condition determining instrument having means for periodically transmitting an electrical impulse and also having indicating means for giving a visual indication of successive, instantaneous values of the condition, a camera connected to said instrument for taking successive pictures of said indicating means, a first shutter in said camera, a cam operatively associated with said shutter and adapted upon actuation to open and close said shutter, means including a spring to actuate said cam, a solenoid and driving connections between it and said spring to load said spring upon energization of the solenoid, a second shutter in said camera, means including a second solenoid adapted upon energization to effect operation of said second shutter, a circuit for said first solenoid including a pair of switches, means responsive to energization of said second solenoid for closing one of said switches, and means responsive to an impulse from said instrument for closing the second of said switches thereby to effect energization of said first solenoid and accordingly load said spring whereby upon deenergization of said first solenoid said spring actuates said cam which in turn actuates said shutter.

IRVING W. DOYLE.
WILLIAM G. HERBSTREIT.
ERWIN C. WEIBLEN.

(References on following page)

REFERENCES CITED

The following references are of record in the file of this patent:

UNITED STATES PATENTS

| Number | Name | Date |
|---|---|---|
| 1,054,598 | Müllner | Feb. 25, 1913 |
| 1,257,624 | Marks | Feb. 26, 1918 |
| 1,383,395 | Folmer | July 5, 1921 |
| 1,490,487 | Schmidt | Apr. 15, 1924 |
| 1,503,401 | Wechsler | July 29, 1924 |
| 1,747,705 | Goldberg | Feb. 18, 1930 |
| 1,838,798 | Voltz | Dec. 29, 1931 |
| 1,933,562 | Michel | Nov. 7, 1933 |
| 1,953,986 | Porter | Apr. 10, 1934 |
| 2,028,608 | Howell | Jan. 21, 1936 |
| 2,080,021 | Wittel | May 11, 1937 |
| 2,129,093 | Kindelmann et al. | Sept. 6, 1938 |
| 2,186,268 | Pakala | Jan. 9, 1940 |
| 2,273,876 | Lutz et al. | Feb. 24, 1942 |
| 2,278,514 | Florman | Apr. 7, 1942 |
| 2,293,349 | Martin et al. | Aug. 18, 1942 |
| 2,336,081 | Finnegan, Jr., et al. | Dec. 7, 1943 |
| 2,346,070 | Fuller | Apr. 4, 1944 |
| 2,400,778 | Osborne | May 21, 1946 |